(12) United States Patent
Tsai et al.

(10) Patent No.: US 7,023,433 B2
(45) Date of Patent: Apr. 4, 2006

(54) COMPUTER-IMPLEMENTED METHOD FOR CONSTRUCTING AND MANIPULATING A THREE-DIMENSIONAL MODEL OF AN OBJECT VOLUME, AND VOXELS USED THEREIN

(75) Inventors: Ming-Dar Tsai, Taoyuan (TW); Ming-Shium Hsieh, Taipei (TW)

(73) Assignee: Chung Yuan Christian University, Taoyuan (TW)

(*) Notice: Subject to any disclaimer, the term of this patent is extended or adjusted under 35 U.S.C. 154(b) by 394 days.

(21) Appl. No.: 10/370,684

(22) Filed: Feb. 19, 2003

(65) Prior Publication Data

US 2004/0070583 A1 Apr. 15, 2004

Related U.S. Application Data

(60) Provisional application No. 60/418,006, filed on Oct. 14, 2002.

(51) Int. Cl.
*G06T 15/00* (2006.01)

(52) U.S. Cl. ............... 345/419; 382/128; 358/1.1
(58) Field of Classification Search ........... 345/419, 345/421, 422; 382/128, 130, 131, 154; 358/1.1
See application file for complete search history.

(56) References Cited

U.S. PATENT DOCUMENTS 6,169,605 B1 * 1/2001 Penn et al. ............... 358/1.1
6,591,004 B1 * 7/2003 VanEssen et al. ......... 382/154
6,842,638 B1 * 1/2005 Suri et al. ................. 600/425

OTHER PUBLICATIONS

Tsai, Ming-Dar, et al., "A New Method for Lumbar Herniated Inter-Vertebral Disc Diagnosis based on Image Analysis of Transverse Sections," Computerized Medical Imaging and Graphics, Dec. 2002, vol. 26, No. 6, pp. 369-380.

Hsieh, Ming-Shium, et al., "Automatic Spinal Fracture Diagnosis and Surgical Management based on 3D Image Analysis and Reconstruction of CT Transverse Sections," Biomedical Engineering Applications Basis and Communications, Oct. 2002, vol. 14, No. 5, pp. 204-214.

(Continued)

*Primary Examiner*—Phu K. Nguyen
(74) *Attorney, Agent, or Firm*—David N. Lathrop, Esq; Gallagher & Lathrop

(57) ABSTRACT

In a computer-implemented method for constructing a three-dimensional model of an object volume, cubic voxels cooperatively define a three-dimensional solid of the three-dimensional model of the object volume. Each voxel has a plurality of voxel faces, and each voxel face is parallel to one of three axes of a rectangular coordinate system. Each voxel has a data structure that includes an object flag portion for describing the corresponding three-dimensional solid, a face flag portion for indicating which ones of the voxel faces serve as a boundary face of the corresponding three-dimensional solid, and a set of distance-levels that represent sample points of the voxel on the three axes of the rectangular coordinate system. The topology and geometry of a boundary of the three-dimensional solid are represented by the face flag portions and the distance-levels of the voxels that are positioned at the boundary.

31 Claims, 6 Drawing Sheets

OTHER PUBLICATIONS

Tsai, Ming-Dar, et al., "Three-dimensional Landmarking Based Maxillomandibular Deformity Diagnosis Using Three-dimensional Computer Tomography," Journal of Medical and Biological Engineering, 2002, vol. 22, No. 3, pp. 129-138.

Hsieh, Mind-Shium, et al., "Virtual reality simulator for osteotomy and fusion involving the musculoskeletal system" Pergamon, Computerized Medical Imaging and Graphics, 26 (2002) pp. 91-10.

Tsai, Ming-Dar, et al., "Virtual reality orthopedic surgery simulator" Pergamon, Computers in Biology and Medicine 31 (2001) pp. 333-351.

Tsai, Ming-Dar, et al., "Accurate Surface Voxelization for Manipul. Volumetric Surfaces & Solids w/ Application in Simulating Musculoskeletal Surgery", Proc., 9th Pacific Conf. on Comp Graphics & Applic, IEEE Comp. Soc., 2001, ISBN 0-7695-1227-5.

* cited by examiner

```
Surface_voxelization_xzline()
    calculate the increment dx/dz from x, z coordinates of
        two endpoint of the line
    increment x in one unit from one end to the other end
    increment INCz and z value by dx/dz
    obtain a z face and sample point by the z value
    if (the z face is an original solid face)
        seed_update(), distance-level_replacement()
    if(the z face is an interior face)
        boundary_generation(),
        discontinuity_counter_ update()
    if (INCz >=1)
        calculate a x face and sample point, INCz minus 1
        if (the x face is an original solid face)
            seed_update(), distance-level_replacement()
        if(the x face is an interior face)
            boundary_generation(),
discontinuity_counter_update( )
```

FIG.6

```
pop a voxel from the stack
fill voxels between x/-x span until boundary face; update x
    extent
increment y,-y, z,-z during the x/-x span to push if solid
    voxels (not boundary) into the stack update y, z extent
repeat the above procedure until the stack is empty
filling conditions
    building: assigning an object flag and material flag
    deletion: assigning the null material
    tear: assigning a new object flag
    join: assigning the joining object flag
    subtraction: assigning the null material
    expansion: assigning the object and material flags
    reposition: collision test, pushing into a stack
```

FIG.8

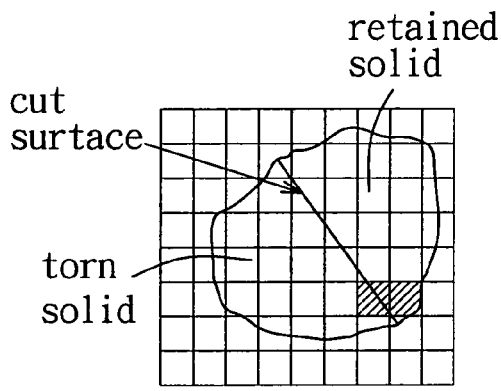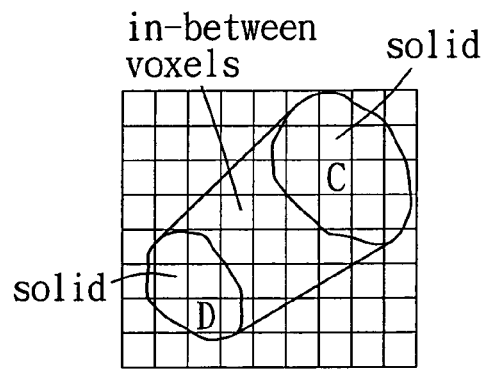
FIG. 9(a)    FIG. 9(b)
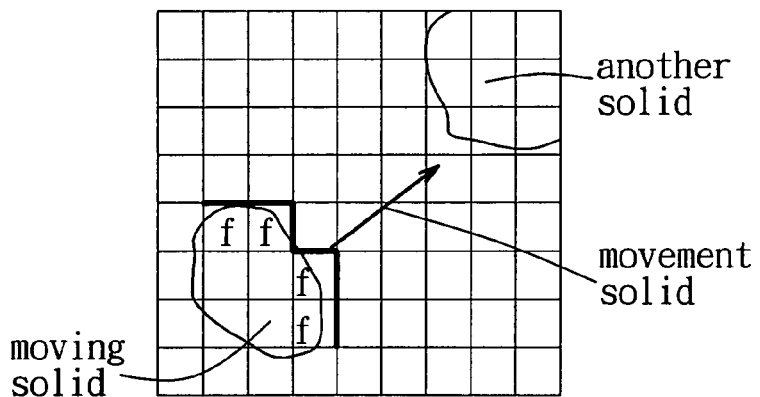
FIG. 10
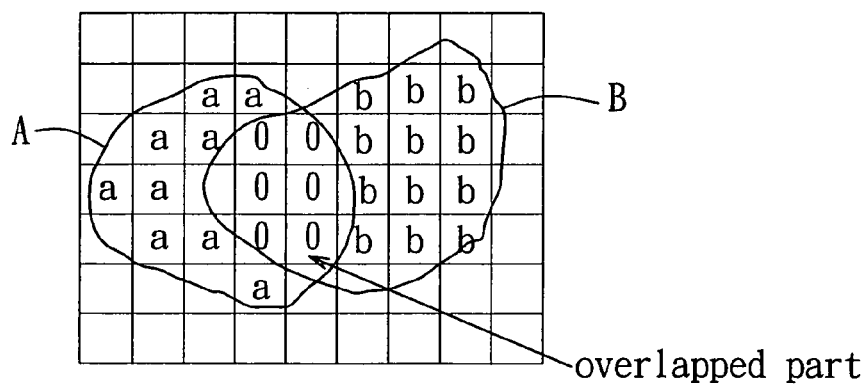
FIG. 11

COMPUTER-IMPLEMENTED METHOD FOR CONSTRUCTING AND MANIPULATING A THREE-DIMENSIONAL MODEL OF AN OBJECT VOLUME, AND VOXELS USED THEREIN

CROSS-REFERENCE TO RELATED APPLICATION

This application claims priority of U.S. Provisional Application No. 60/418,006, filed on Oct. 14, 2002, the entire disclosure of which is incorporated herein by reference.

BACKGROUND OF THE INVENTION

1. Field of the Invention

The invention relates to a computer-implemented method for constructing and manipulating three-dimensional models of object volumes, such as anatomical parts, so as to be applicable to the simulation of surgical procedures.

2. Description of the Related Art

With the ongoing advancement in medical science, students, interns and even senior surgeons have a constant need to enrich their knowledge of surgical techniques and procedures so as to be able to provide patients with the best and most up-to-date medical services.

In the fields of osteopathy and orthopedic surgery, if surgical simulation equipment is not available to assist in the teaching and training of medical personnel, it is not possible to predict the outcome of an operation with a certain degree of accuracy or to meet the expectations of the patient undergoing the operation. Thus, the outcome of the operation depends largely on the clinical experience of the surgeon. Moreover, patients are at a high risk when undergoing an operation since the human body does not allow for a trial-and-error process. If the operation is not successful, another operation may be needed, which is, again, without certainty of success.

Teaching hospitals and some medical institutions have currently included surgical simulation as part of their curriculums or training programs. Traditionally, surgical simulations are largely limited to two-dimensional paper simulations based on X-ray images. In recent years, various two-dimensional surgical simulation visual equipment have been developed that permits input of a surgical manipulation and display of a two-dimensional image of the simulation result on a monitor. However, in the case of the human skeletal system, inview of the numerous irregular curved surfaces, it is not possible to depict the geometry of bone structures in a realistic manner by merely relying on a two-dimensional model. There are considerable visual errors when viewing the two-dimensional model on a monitor. In addition, since the surgical manipulation is limited by the two-dimensional image, and since the input information cannot fully match the surgical manipulation during an actual operation, the simulation result is expected to be imprecise and unreliable. Such a simulation model is therefore not very helpful to students and trainees as a pre-operation simulation tool, and the simulation result cannot be relied upon when predicting the outcome of an operation.

It is known in the art to use computer tomographic two-dimensional slice data for the reconstruction of three-dimensional models. A cubic voxel is generally used as a basic unit of the three-dimensional model. The known voxel records a scalar that can be used to represent material properties, such as material type and boundary. While conventional voxel data structures may be extensive for solid manipulations, they are insufficient to accurately describe the surface topology. Current surface voxelization uses continuous voxels to represent a surface. However, because the model surface is actually a solid, e.g., having a one-voxel thickness, many surface properties, such as whether the intersection between the surface and another solid is closed to form a new solid or left unclosed and dangled inside said another solid, cannot be judged after conventional surface voxelization.

Traversal algorithms are available in the art for traversing regularly positioned voxels. For instance, seed and flood algorithms can traverse all voxels inside a closed boundary, which consists of boundary voxels, so that pointers or links for neighboring solid information are unnecessary. Object flags are used to distinguish among different solids. Because seed and flood algorithms traverse a set of continuous voxels inside a closed boundary, it is hereby proposed to extend the same for manipulating a solid and for checking whether non-closed boundaries or dangling surfaces exist inside the solid.

SUMMARY OF THE INVENTION

Therefore, the main object of the present invention is to provide a computer-implemented method for constructing and manipulating realistic three-dimensional models of object volumes, such as anatomical parts, so as to be applicable to the simulation of a wide range of surgical procedures, e.g., real-time interactive virtual surgery, with precise and reliable simulation results.

Another object of the present invention is to provide a computer-implemented method of the aforesaid type that involves extended voxel data structures for accurately describing the surface topology of three-dimensional models.

Still another object of the present invention is to provide a computer-implemented method of the aforesaid type that permits solid manipulation, boundary checking and detection of dangling surfaces.

Yet another object of the present invention is to provide a computer-implemented method of the aforesaid type that involves modified seed and flood algorithms for various solid manipulations.

A further object of the present invention is to provide a computer-generated three-dimensional solid to represent a three-dimensional model of an object volume, and voxels with extended data structures for defining the computer-generated three-dimensional solid.

According to one aspect of the invention, there is provided a computer-implemented method for constructing a three-dimensional model of an object volume, comprising the step of:

constructing cubic voxels that cooperatively define a three-dimensional solid of the three-dimensional model of the object volume, each of the voxels having a plurality of voxel faces, each of the voxel faces being parallel to one of three axes of a rectangular coordinate system, each of the voxels having a data structure that includes an object flag portion for describing the corresponding three-dimensional solid, a face flag portion for indicating which ones of the voxel faces serve as a boundary face of the corresponding three-dimensional solid, and a set of distance-levels that represent sample points of the voxel on the three axes of the rectangular coordinate system, wherein topology and geometry of a boundary of the three-dimensional solid are represented by the face flag portions and the distance-levels of the voxels that are positioned at the boundary.

According to another aspect of the invention, there is provided a computer-implemented method for constructing and manipulating a three-dimensional model of an object volume, comprising the steps of:

constructing cubic voxels that cooperatively define a three-dimensional solid of the three-dimensional model of the object volume, each of the voxels having a plurality of voxel faces, each of the voxel faces being parallel to one of three axes of a rectangular coordinate system, each of the voxels having a data structure that includes an object flag portion for describing the corresponding three-dimensional solid, a face flag portion for indicating which ones of the voxel faces serve as a boundary face of the corresponding three-dimensional solid, and a set of distance-levels that represent sample points of the voxel on the three axes of the rectangular coordinate system, wherein topology and geometry of a boundary of the three-dimensional solid are represented by the face flag portions and the distance-levels of the voxels that are positioned at the boundary; and rendering an image of the three-dimensional solid through a seed and flood algorithm.

Preferably, the seed and flood algorithm includes at least one of a building step, a deletion step, a tearing step, a joining step, a subtracting step, an expansion step, and a repositioning step.

According to still another aspect of the invention, there is provided a computer-implemented method for constructing and manipulating a three-dimensional model of an anatomical part, comprising the steps of:

providing a stack of two-dimensional image slice information of the body part;

constructing cubic voxels from the image slice information, the voxels cooperatively defining a three-dimensional solid of the three-dimensional model of the body part, each of the voxels having a plurality of voxel faces, each of the voxel faces being parallel to one of three axes of a rectangular coordinate system, each of the voxels having a data structure that includes an object flag portion for describing the corresponding three-dimensional solid, a face flag portion for indicating which ones of the voxel faces serve as a boundary face of the corresponding three-dimensional solid, and a set of distance-levels that represent sample points of the voxel on the three axes of the rectangular coordinate system, wherein topology and geometry of a boundary of the three-dimensional solid are represented by the face flag portions and the distance-levels of the voxels that are positioned at the boundary; and manipulating the three-dimensional solid for surgical simulation.

Preferably, manipulation of the three-dimensional solid is conducted through a seed and flood algorithm that includes at least one of a building step, a deletion step, a tearing step, a joining step, a subtracting step, an expansion step, and a repositioning step.

According to yet another aspect of the invention, there is provided a voxel that is used to define a computer-generated three-dimensional solid of a three-dimensional model of an object volume. The voxel has a plurality of voxel faces, and each of the voxel faces is parallel to one of three axes of a rectangular coordinate system. The voxel has a data structure that comprises:

an object flag portion for describing the corresponding three-dimensional solid;

a face flag portion for indicating which ones of the voxel faces serve as a boundary face of the corresponding three-dimensional solid; and a set of distance-levels that represent sample points of the voxel on the three axes of the rectangular coordinate system.

According to a further aspect of the invention, there is provided a computer-generated three-dimensional solid to represent a three-dimensional model of an object volume, comprising cubic voxels that cooperatively define the three-dimensional solid. Each of the voxels has a plurality of voxel faces, and each of the voxel faces is parallel to one of three axes of a rectangular coordinate system. Each of the voxels has a data structure that includes an object flag portion for describing the three-dimensional solid, a face flag portion for indicating which ones of the voxel faces serve as a boundary face of the three-dimensional solid, and a set of distance-levels that represent sample points of the voxel on the three axes of the rectangular coordinate system. The topology and geometry of a boundary of the three-dimensional solid are represented by the face flag portions and the distance-levels of the voxels that are positioned at the boundary.

BRIEF DESCRIPTION OF THE DRAWINGS

Other features and advantages of the present invention will become apparent in the following detailed description of the preferred embodiment with reference to the accompanying drawings, of which:

FIG. 2($b$) is a plot to illustrate intersections of the solid (S) of FIG. 2($a$) with the two surfaces ($S_1$, $S_2$);

FIG. 2($c$) illustrates closed loops ($L_1$, $L_2$) and a non-closed curve ($L_3$) formed as a result of intersection of the solid (S) of FIG. 2($a$) with one of the surfaces ($S_1$);

FIG. 2($d$) is a topological representation of the closed loop ($L_1$) shown in FIG. 2($c$);

FIG. 4($b$) illustrates an object volume before voxelization;

FIG. 4($c$) illustrates the object volume of FIG. 4($b$) after voxelization;

FIG. 6 illustrates a surface voxelization algorithm employed in the preferred embodiment of this invention;

FIG. 8 illustrates a three-dimensional seed and flood algorithm for manipulating volumetric solids according to the preferred embodiment of this invention;

FIG. 9($a$) illustrates a tearing step of the seed and flood algorithm of the preferred embodiment;

FIG. 9($b$) illustrates a non-contact join formed as a result of the seed and flood algorithm of the preferred embodiment;

FIG. 10 illustrates a collision test of the computer-implemented method of the preferred embodiment; and FIG. 11 illustrates Boolean operations between two solids in the computer-implemented method of the preferred embodiment.

DETAILED DESCRIPTION OF THE PREFERRED EMBODIMENT

Figure 1:
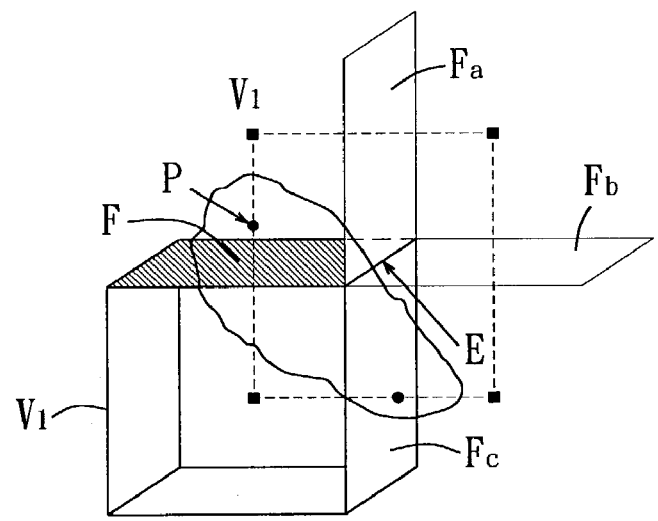
FIG. 1 illustrates how topology and geometry of surfaces and solid boundaries can be represented by faces and sample points of voxels in the preferred embodiment of the computer-implemented method for constructing a three-dimensional model of an object volume according to this invention.

In the preferred embodiment of the computer-implemented method according to this invention, the boundary faces of boundary voxels and their adjoint sample points are used to represent the topology and geometry of a solid boundary. For a boundary voxel, at least one of up to six face-neighboring voxels thereof belongs to a distinct or different solid. FIG. 1 illustrates how the topology and geometry of surfaces and solid boundaries can be represented by faces and sample points of voxels. As shown in FIG. 1, boundary face (F) is the common face of a voxel ($V_1$) and a neighboring voxel ($V_2$) of the distinct solid. Owing to resolution considerations, only one sample point (P) can be determined from the values of the two voxels ($V_1$, $V_2$). The sample point (P) is located between the centers of the voxels ($V_1$, $V_2$).

Figure 2A:
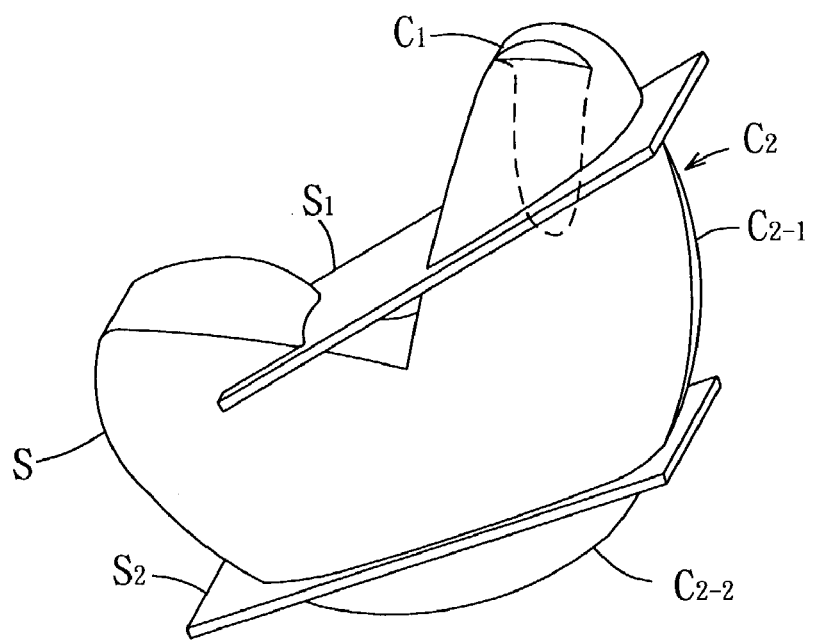
FIG. 2($a$) is a perspective view illustrating a solid (S) intersected by two surfaces ($S_1$, $S_2$)
Figure 2B:
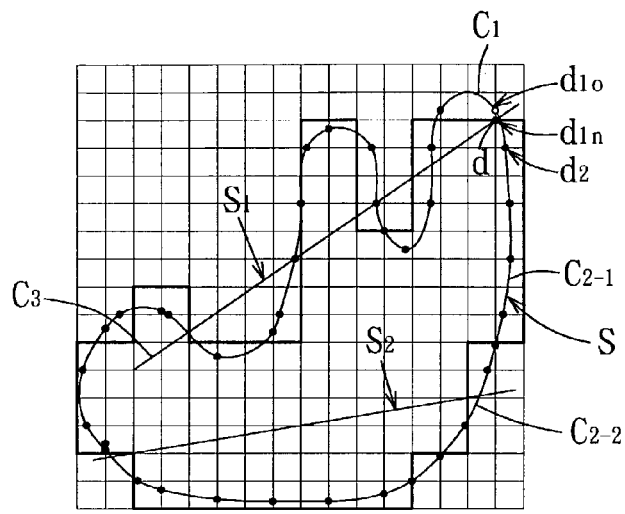
Figure 3:
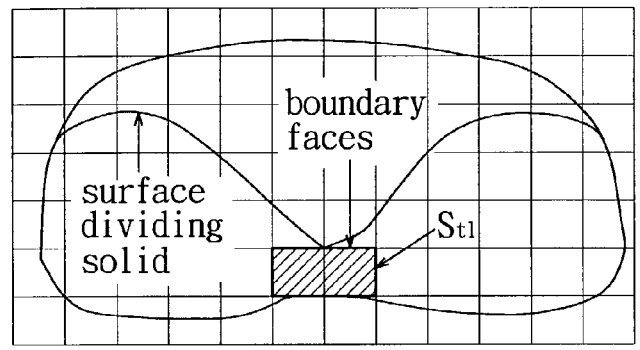
FIG. 3 is a side view to illustrate a solid, in which new boundary voxels form a one-voxel wide strait that excludes the flood of a seed and flood algorithm when voxels are used as the boundary condition.

However, the intersection of a surface and a solid is not always closed. FIGS. 2(a) and 2(b) illustrate the intersections between two surfaces ($S_1$, $S_2$) and one solid (S). As shown in the example of FIGS. 2(a) and 2(b), two closed boundaries ($C_1$, $C_2$) and a dangling surface ($C_3$) are generated after the surface ($S_1$) intersects with the solid (S). Each closed boundary ($C_1$, $C_2$) forms a new independent solid. The solid associated with the closed boundary ($C_2$) is further divided by the other surface ($S_2$) into closed boundaries ($C_{2\_1}$, $C_{2\_2}$). Seed and flood algorithms independently traverse each solid. However, as best shown in FIG. 3, because the new boundary voxels generated by the surfaces may form a one-voxel wide strait (st1) that could exclude the flood, the boundary conditions used in the seed and flood algorithms become boundary faces and not voxels. This suggests the use of voxel faces to represent intersection boundaries. A dangling surface includes at least one discontinuous boundary face that has at least one discontinuous edge. As shown in FIG. 1, an edge (E) is continuous if either edge-sharing face ($F_a$, $F_b$ or $F_c$) is also a boundary face. A new intersecting surface may connect the dangling surface to form a closed boundary if the new intersecting surface produces all edge-sharing boundary faces for the discontinuous edges of the dangling surface. It should be noted that, in surgical simulatioris, the user may not completely divide a solid by a single cut, and can cancel the cut or input new cuts until a closed boundary is created.

To begin the flood, the seed should be determined during the intersection computation. The intersection of a surface with the boundary of a solid can indicate a closure. If a closed loop on the intersection (e.g., a closure) is detected, two seeds can be assigned to each side of the surface. Consequently, multiple seeds may indicate the same new closed boundary. A flood beginning from a seed will traverse and delete other seeds if they all indicate the same solid. If the intersection fails to form a closed loop on the solid boundary, the surface is dangling inside the solid. The intersection may form a loop if connected to other surface intersections on the same solid boundary. However, even if a closed loop is generated by the connection, there may still exist discontinuous faces on the dangling surface. Therefore, whether all discontinuous edges of the dangling surface are deleted must be confirmed before assigning seeds.

Figure 2C:
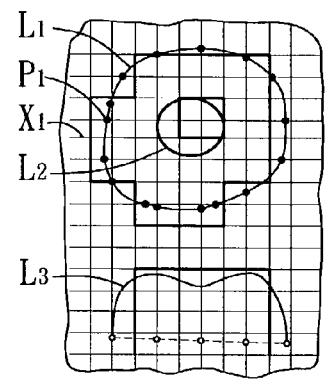
Figure 2D:
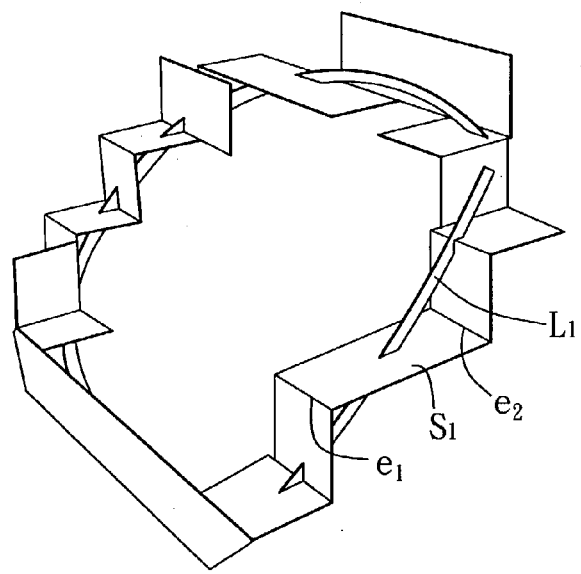

FIG. 2(c) shows two closed isolated (non-crossing) loops ($L_1$, $L_2$) and one non-closed curve ($L_3$) obtained from the intersection of the surface ($S_1$) with the boundary of the solid (S) (see FIGS. 2(a) and 2(b)) The intersection of the surface ($S_2$) with the boundary of the solid (S) results in-a closed loop. Two seeds obtained from the intersection of the surface ($S_1$) and the solid (S), and one seed obtained from the intersection of the surface ($S_2$) and the solid (S), all indicate the same closed boundary ($C_{2\_1}$). In practice, a loop can be geometrically approximated by sample points (such as P1) which are actually intersection points of the loops ($L_1$, $L_2$, $L_3$) on axis-parallel lines (such as X1) that connect the voxel centers, and then topologically represented by the adjoint boundary faces of the sample points. FIG. 2(d) shows the topological representation of the closed loop ($L_1$). On the loop ($L_1$), every boundary face (such as s1) has two edges (such as e1, e2) connected to other boundary faces on the loop ($L_1$).

Discontinuous boundary faces cause a problem during isosurface reconstruction because any cube that includes one or more sample points from the discontinuous faces will not be a case processed in reconstruction algorithms. Therefore, a cube that includes any discontinuous face should not be processed in the isosurface reconstruction. Conventional one-value voxels cannot represent the discontinuous faces and sample point replacements. As shown in the example of FIG. 2(b), the surface ($S_1$) cuts away a little material from the solid (S) at voxel (d), and changes the sample point from ($d_{1o}$) to ($d_{1n}$). However, another sample point ($d_2$) is not replaced. Changing the value of one-value voxel (d) will affect the sample points ($d_{1o}$, $d_2$) Therefore, the six voxel faces and the sample points should be represented by independent variables to model the replacement and the discontinuous boundary faces.

In the preferred embodiment of the present invention, the data structure of a voxel includes an object flag portion having an object flag and a material flag for describing a computer-generated three-dimensional solid corresponding to an object volume that is to be manipulated, a face flag portion having six face flags for indicating which ones of the six voxel faces serve as a boundary face of the corresponding three-dimensional solid, and a set of six distance-levels that represent sample points of the voxel on the three axes of a rectangular coordinate system. The voxel face is an x (-x, y, -y, z or -z) boundary face if the x (-x, y, -y, z or -z) neighbor belongs to a distinct or different material or solid. The material and object flags can be encoded into one byte if there exists not many material and solid types. Because two neighboring voxels share the same sample point, three distance-levels can be used to represent six sample points. However, the use of only three distance-levels can result in errors when the neighboring voxels no longer share the same sample point, such as when repositioning solid. Aside from voxels, the data structure of a solid includes an object flag and a material flag, a seed voxel and other properties, such as color and name. A seed-curve records a beginning face and an end face, which are used to detect a closed loop.

In the preferred embodiment of the present invention, an object volume, such as a measured volume from MRI or CT slices, includes several materials in which threshold values can classify a voxel as a particular material. The object flags of all voxels are all initialized as null and considered as original solids before any manipulation. Null materials, such as air in medical applications, have neither topologic nor geometric significance. The distance-levels and face flags of any two voxels of different materials are computed along the axis-parallel lines that pass through the voxel centers. FIG.

4(a) illustrates the conversion among sample point, distance-levels and original gray-levels of two boundary voxels. As shown in FIG. 4(a), an axis-parallel line (L) passes through the centers of two voxels (vl, vm) of different materials. The distance-levels of the voxels (vl, vm) are denoted as (gl, gm), respectively. The sample point of the face shared by the two voxels (vl, vm) is denoted as (b). Parameter (N) is the number of distance-levels, whereas parameter (T) is a threshold value. Gray-levels of the two voxels (vl, vm) are denoted as (sl, sm), respectively. The following is a conversion formula for the conversion among sample point, distance-levels and original gray-levels of the voxels (vl, vm).

$$-gl/N=gm/N=[(sm-T)/(sm-sl)]-\tfrac{1}{2}$$

Figure 4B:
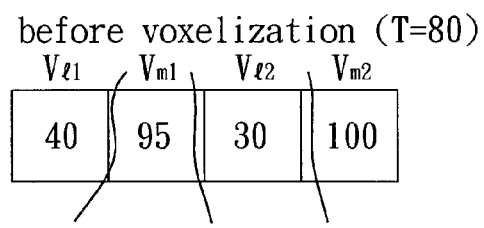
FIG. 4($a$) illustrates the conversion among the sample point, distance-levels and original gray levels of two boundary voxels of distinct materials.
Figure 4A:
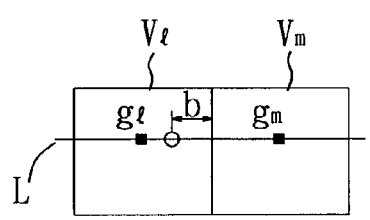
Figure 4C:
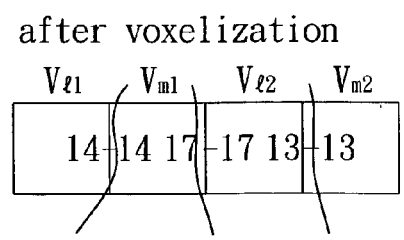

FIGS. 4(b) and 4(c) show a voxelization example, in which (vl1) and (vl2) are voxels of one material, and (vm1) and (vm2) are voxels of another material. A boundary passes through the voxels (vl1, vl2, vm1, vm2). The face flags of voxel (vl1) are 0 and 1, while those of voxel (vm1) are 1 and 1, those of voxel (vl1) are 1 and 1, and those of voxel (vm2) are 1 and 0.

In the preferred embodiment of this invention, before manipulating an object volume, tool volumes or template volumes are also voxelized. A tool volume or template volume contains one or more solids used to implement Boolean operations with solids in the object volume or to replace some voxels in the object volume. The tool solids used herein are suitable for musculoskeletal surgical simulation and include cylindrical nails, whereas the template solids include bone grafts and prostheses. The tool and template solids are designed in a computer system, such as an AutoCAD system. The voxel sizes of the template and tool volumes are set to be the same as that of the object volume. In addition, the voxelization for the template and tool volumes is the same as that for the object volume.

Isosurfaces are employed in the preferred embodiment to visualize solid boundaries because they help in observing surface features and are compatible with standard pipelines of standard three-dimensional graphics hardware. However, isosurface reconstruction suffers the disadvantage of being time-consuming. Usually, a manipulation only involves a small part of a medical volume. Therefore, in this invention, an object, template or tool volume is divided into several sub-volumes, and only the isosurfaces of manipulated sub-volumes are reconstructed. When a three-dimensional seed and flood algorithm traverses a solid in the computer-implemented method of this invention, the traversed extent is computed simultaneously to determine the manipulated sub-volumes.

The marching cube algorithm is used in the preferred embodiment to reconstruct the isosurfaces in which distance-levels are used as sample points, and in which the surface normal on a sample point is calculated through its four neighboring sample points. For instance, if the sample point is obtained from an x boundary face, the four neighboring points are also x sample points and are determined from the nearest ones in the y-, -y-, z- and -z-axis parallel directions, respectively. The surface normal can be determined from the four neighboring points by obtaining the cross product of two tangents passing through the sample point. In this invention, distinct colors can be assigned to different solids of the same material by reconstructing their isosurfaces individually, so that a solid can be highlighted to distinguish the same from other solids of the same material.

In the computer-implemented method of the present invention, after voxelization of all solids in the object, template and tool volumes, surfaces can be input into the object volume to generate new solid boundaries. These surfaces are limited to be non-self intersection in the preferred embodiment. Particularly, in surgical simulations, the user inputs a series of cuts in order to carve out a solid, e.g., an anatomical part. These cuts generally do not intersect, but connect to form a continuous surface. Similar to the solid voxelization, sample points at intersections of the surfaces with the solids on the axis-parallel lines reveal the information of the surface voxelization, including the distance-levels (geometric information) and face flags (topology information) of new boundary faces. Whether the boundary faces are continuous and form a loop are further computed. A polygonal surface can simplify the calculation of sample points because it becomes an increment.

Figure 5:
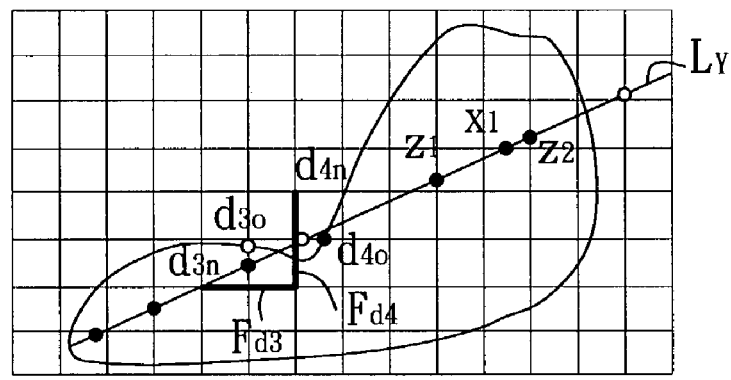
FIG. 5 illustrates a surface voxelization example of the preferred embodiment of this invention.

To obtain the sample points of a cut polygon, two sets of parallel lines on the polygon are used to increment the sample points. Two smaller components (e.g., x and y components) of the surface normal of the polygon are chosen to determine the parallel lines. One set of parallel lines has a constant integral y coordinate, in which each line space has one y coordinate unit. Another set of parallel lines has a constant integral x coordinate, in which each line space has one x coordinate unit. As shown in FIG. 5, a line (Ly) with a constant integral y coordinate is used to calculate the sample points of x, -x, z and -z boundary faces. FIG. 6 illustrates the surface voxelization algorithm of this embodiment, where x is an incremented integer, while the increment for z is equal to the slope of the line (dx/dz). The x, y and z values of the incremented point reveal which z face the incremented point belongs to. If the z face is not connected to the z face of the previous z sample point, the line traverses diagonally and passes an x face. Accordingly, as shown in FIG. 5, because the z value of the sample point ($x_1$) of the x face is 0, the distance-level can be interpolated using the z values of two adjacent sample points (indicated as $z_1$ and $z_2$ in FIG. 5). Various subroutines are implemented according to the material and object flags of the two voxels sharing the face of the incremented point. No subroutines will be implemented if the two voxels do not belong to any solid, indicating that the surface is outside all solids, or if the two voxels belong to a solid and the face is a boundary, indicating that the face has already been cut. In musculoskeletal surgerical simulation, a bone-sectioning cut may overlap partially with a previous cut not for cutting but just to facilitate handling of an instrument. However, if the two voxels belong to a solid, and the face is not a boundary, a boundary generation and a discontinuity counter update are implemented. Moreover, if the face is an original boundary, meaning that the two voxels are different solids, a seed-curve update and a distance-level replacement are implemented.

In the replacement, a classification is implemented to determine whether the new distance-level (sample point) replaces the existing distance-level. FIG. 5 illustrates the replacements at ($F_{d3}$) and ($F_{d4}$), in which ($d_{3n}$) is inner than ($d_{3o}$) and therefore replaces ($d_{3o}$) but ($d_{4n}$) does not replace ($d_{4o}$). In the seed-curve update, four edges of the face are checked to detect whether their edge-sharing neighboring faces are on seed-curves. If no neighboring faces are recorded on any seed-curve, a new seed-curve is created to record the boundary face as both the beginning and end faces. If only one neighbor of the face is already a beginning or end face of a seed-curve, the face replaces the neighbor as the beginning or end face of the seed-curve. If there are two neighboring faces on the same seed-curve, a closed loop is formed, and the two voxels sharing the face are assigned as seeds. If the two neighboring faces belong to different seed-curves, one seed-curve is deleted for merging. The two neighboring faces are no longer recorded in the remaining loop, and the other neighboring faces recorded in the original two loops remain as the beginning and end faces.

Figure 7:
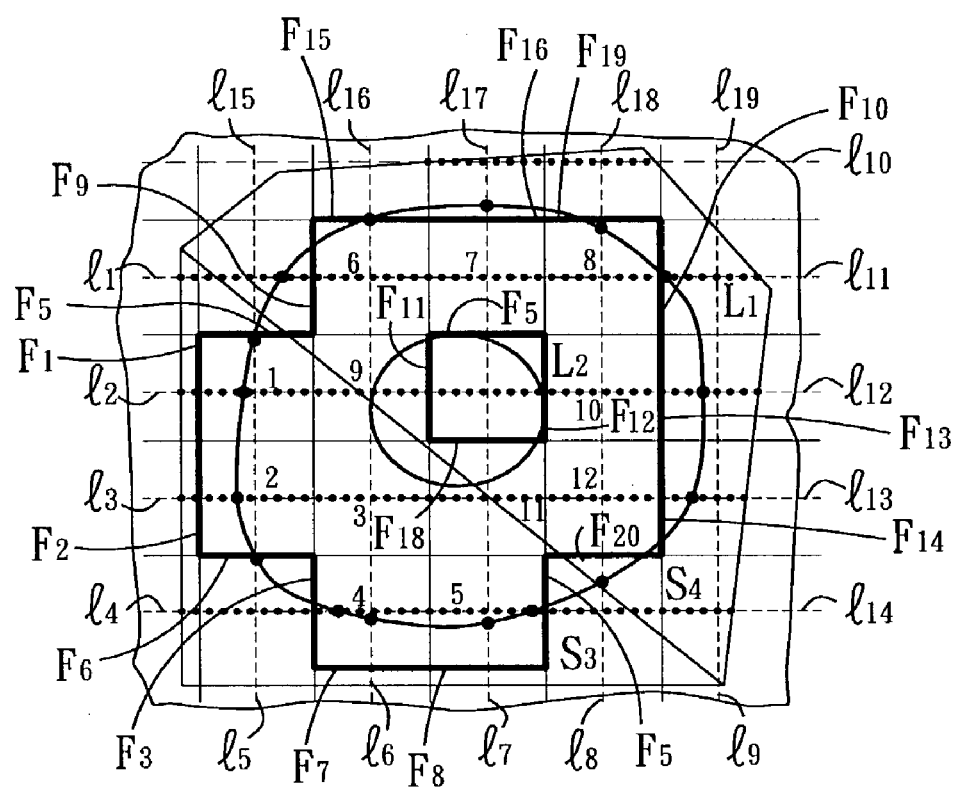
FIG. 7 illustrates the seed-curve update during another surface voxelization example, shown in two-dimensional for clarity.

FIG. 7 illustrates an example of the seed-curve update in two-dimensional form for the sake of clarity. Polygons ($S_3$) and ($S_4$) are continuous and represent a surface penetrating a solid. A set of parallel (horizontal) lines ($l_1$, $l_2$, $l_3$, $l_4$) and a set of parallel (vertical) lines ($l_5$, $l_6$, $l_7$, $l_8$, $l_9$) on the polygon ($S_3$) are generated to voxelize the intersection of the polygon ($S_3$) with the solid. A set of parallel (horizontal) lines ($l_{10}$, $l_{11}$, $l_{12}$, $l_{13}$, $l_{14}$) and a set of parallel (vertical) lines ($l_{15}$, $l_{16}$, $l_{17}$, $l_{18}$, $l_{19}$) are generated to voxelize the intersection of the polygon ($S_4$) with the solid. $F_1$ is the boundary face of an intersection of the line ($l_2$) with the original boundary of the solid, while $F_2$ is obtained from the line ($l_3$), $F_3$ and $F_4$ are obtained from the line ($l_4$), $F_5$ and $F_6$ are obtained from the line ($l_5$), $F_7$ is obtained from the line ($l_6$), $F_8$ is obtained from the line ($l_7$), $F_9$ and $F_{10}$ are obtained from the line ($l_{11}$), $F_{11}$, $F_{12}$ and $F_{13}$ are obtained from the line ($l_{12}$), $F_{14}$ is obtained from the line ($l_{13}$), $F_{15}$ is obtained from the line ($l_{16}$) $F_{16}$, $F_{17}$ and $F_{18}$ are obtained from the line ($l_{17}$), and $F_{19}$ and $F_{20}$ are obtained from the line ($l_{18}$). The first seed-curve is created for recording the boundary face $F_1$ (beginning) and then the boundary face $F_2$ (end). The second and third seed-curves are created for the boundary faces ($F_3$) and ($F_4$), respectively. The boundary face ($F_5$) replaces the boundary face ($F_1$) as the beginning of the first seed-curve. At the boundary face ($F_6$), the first and second seed-curves merge as one (1-2 curve with the beginning $F_5$ and the end $F_3$). The boundary face ($F_7$) then replaces the boundary face ($F_3$). At the boundary face ($F_8$), the third curve and the 1-2 curve merge into the 1-2-3 curve. The boundary face ($F_9$) replaces the boundary face ($F_{13}$) of the 1-2-3 curve. The fourth seed-curve is created for the boundary face ($F_{10}$) and then the boundary face ($F_{13}$). The boundary face ($F_{14}$) replaces the boundary face ($F_{13}$). The boundary face ($F_{15}$) replaces the boundary face ($F_9$), and the boundary face ($F_{16}$) replaces the boundary face ($F_{15}$) of the 1-2-3 curve. At the boundary face ($F_{19}$), the fourth and 1-2-3 curves merge. Then, at the boundary face ($F_{20}$), the beginning and end faces of the merged curve connect together to form a loop ($L_1$). In the same manner, another loop ($L_2$) can be obtained from the boundary faces ($F_{11}$), ($F_{12}$), ($F_{17}$) and ($F_{18}$).

In the example of FIG. 7, $F_1$ to $F_{20}$ are original boundary faces of the intersected solid, and are simplified as edges from the two-dimensional view. Boundary faces perpendicular to the two-dimensional view cannot be observed, and are thus omitted.

During the boundary generation, the distance from the sample point to the middle of the two voxels sharing the face determines the distance-level. Face-flags are also assigned to the two voxels to indicate that the face is a boundary. In the discontinuity counter update, whether the four edge-sharing neighboring faces are all boundary faces is checked to confirm the discontinuity of the new boundary face. In the event of discontinuity, one face-flag is not assigned as a boundary. Consequently, the two face-flags become inconsistent, indicating that the face is discontinuous, and the discontinuity counter is incremented. Whether the four edge-sharing neighboring faces were and are discontinuous is then checked. If a neighboring face was discontinuous before the boundary generation but is no longer discontinuous, the discontinuity counter is decremented, and the face inconsistency of the neighboring face is corrected. If the discontinuity counter is zero, no discontinuous faces remain inside the solid. FIG. 7 also shows an example of discontinuity counter updates. Particularly, the discontinuity counter is one at Face 1; two at Faces 2, 3 and 11; three at Faces 4, 5, 9 and 10; four at Face 6; and five at Faces 7 and 8. The counter becomes zero at Face 12.

In the preferred embodiment of the computer-implemented method of this invention, an efficient seed and flood algorithm is employed in which solid voxels along some axis (such as the x-axis) direction are traversed directly and not stacked. FIG. 8 shows the algorithm to include filling (processing) conditions for solid manipulations, including topology operations (such as building, deletion, tearing, joining, subtracting and expansion) and repositioning. The boundary condition in the algorithm is boundary faces. For example, when traversing along the x-axis direction, whether the -x face of the traversed voxel is a boundary face is checked. The iterative procedure of the algorithm consists of four parts: (1) popping up a voxel in the stack for processing; (2) traversing and filling other voxels along the x- or -x- axis direction from the popped voxel until a boundary is reached; (3) saving the two extremes of this x-axis span; and (4) verifying whether the four neighboring spans (which share the same x coordinate but with the y and z coordinates at plus or minus 1) contain solid voxels that are pushed into the stack. Step (4) actually traverses along the y-, -y-, z- or -z- axis direction. Traversed extents are recorded by updating the x and -x extents during step (3), and the y, -y, z and -z extents during step (4).

The building step of the seed and flood algorithm creates a new solid from a closed boundary of a null material by assigning a name and a seed (one seed obtained from the boundary generation) to the new solid for beginning the flood and by traversing and filling the object flag portions, i.e., the object and material flags, of the voxels inside the closed boundary with the material flag of the new solid. The deletion step of the seed and flood algorithm is the inverse of the building step, and nullifies a solid of a closed boundary and of a certain material by assigning a seed to the solid for beginning the flood and by traversing and filling the object flag portions of the voxels inside the closed boundary with null material flag. With reference to FIG. 9(*a*), the tearing step of the seed and flood algorithm separates a solid by forming a cut surface that penetrates the solid and by filling the object flag portions of the voxels on one side of the cut surface with another object flag to form a new solid on said one side of the cut surface. The voxels on the other side of the cut surface retain the properties, such as the name and the object flag, of the original solid. The original seed, however, is replaced by one generated during the surface cutting. The joining step of the seed and flood algorithm is the inverse of the tearing step, and repositions a joining solid to contact a joined solid, fills all of the voxels of the joined and joining solids by a flood beginning from a seed of the joining solid, and sets a boundary face shared by one joined solid voxel and one joining solid voxel as an interior for deleting the boundary between said one joined solid voxel and said one joining solid voxel. The subtracting step of the seed and flood algorithm resembles the tearing step, and separates a solid by forming a cut surface that penetrates the solid and by nullifying the voxels on one side of the cut surface. The expansion step of the seed and flood algorithm is the inverse of the subtracting step, and expands a solid by connecting a closed boundary to the boundary of the solid and by filling the voxels inside the closed boundary with the object flag portions of the voxels inside the solid.

Other topology operations can be achieved by combining the above operations. FIG. 9(*b*) shows a non-contact join, in which two non-contacting solids have a closed boundary surrounding in-between voxels of a distinct material. In musculoskeletal surgery, two opposite bones are frequently fixed within a short distance and are then fused into one in a period. An expansion that expands one solid to the in-between voxels, followed by joining of the other solid to the expanded solid, can implement the non-contact join.

In the repositioning step of the seed and flood algorithm, a solid is stored into a series of stacks during the flood, the object flag portions of the voxels of the solid are filled with null material flag, and the voxels in every stack are placed at new positions. The solid seed is also translated. If the solid is not set as null, an error occurs because the manipulation becomes a duplication. Because the seed and flood algorithm traverses the continuous voxels along an axial direction (such as the x- or -x- axis direction), all the continuous x span voxels are stacked in a stack, and the position of the topmost voxel is recorded. The voxels of the solid in the stack are then shifted voxel by voxel to new positions in the reverse order as they were stacked. The solid is repositioned after all the stacks are processed. The traversal extent of shifting the solid can be obtained by shifting the extent of stacking the solid. Preferably, a collision test is simultaneously implemented during the repositioning step to avoid over lapping with other solids. For example, in musculoskeletal surgery, collisions between a moving bone or a surgical tool with other bones or nerves must be avoided. The collision test is implemented by detecting whether all of the front voxels of a solid can move without collision. As illustrated in FIG. 10, a front voxel is a boundary voxel when the dot product between the movement vector and the surface normal of any boundary face of the Voxel is positive. Six-ray traversing algorithms can select the next voxel along the movement vector from six face-sharing neighbors based on incremental computations. An efficient algorithm that uses two decision variables to determine the next voxel, such as that disclosed in Cohen, et al., "3D Line Voxelization and Connectivity Control", *IEEE CG&A*, Vol. 17, No. 6, pp. 80–87, 1997, is employed in the preferred embodiment of the method of this invention. The first traversed voxel of distinct solids is the collided voxel. When a collision occurs, the six-ray traversing distance is compared with a collision distance and is replaced if it is smaller. Thus, after processing all of the front voxels, the collision distance can be obtained, which reveals the distance the solid can move without a collision occurring or without contacting another solid.

A Boolean operation is implemented by first aligning a template (or tool) volume with the object volume. If no voxel spaces exist simultaneously in the object and template solids, the voxels of the template solid can simply replace the object volume voxels. Otherwise, as shown in FIG. 11, the template (or tool) solid (B) can be considered as being comprised of an overlapped part (o voxels) and a remaining template part (b voxels) The solid (A) of the object volume can be also considered to comprise an overlapped part and a remaining part (a voxels). The boundary of the template or tool solid (B) works as a surface to generate new boundary voxels (a) in the object solid (A) by assigning opposite (e.g., x) distance-levels and face-flags of boundary voxels (o) of the template or tool solid (B) to the neighboring voxels (a) of the object solid (A). This boundary generation also implements a distance-level replacement and a seed-curve update when the object volume voxel is already a boundary voxel. Seed-curve updates can generate seeds for traversing one or more separate sets of voxels in the overlapped or remaining parts. In the union (A∪B), the remaining template voxels first replace the ones in the object volume, and then expand to the object solid (A). In the difference (A−B), the overlapped voxels of the object solid (A) are nullified, and separate sets of the remaining object solid (A) are traversed as independent solids. In the intersection (A∩B), the remaining object solid (A) is nullified, and separate sets of the overlapped object solid (A) are traversed as independent solids.

According to the preferred embodiment of the computer-implemented method of this invention, manipulation functions can be used to simulate most musculoskeletal surgeries, including arthroplasty, corrective or open osteotomy, open reduction for complicated fractures, and amputation. In U.S. Provisional Application No. 60/418,006, filed by the applicant, there is disclosed an example to demonstrate the simulation of a knee arthroplasty performed to replace a destroyed joint and to correct a mal-positioned tibia. In the simulation, a surgeon cut the skeleton (original solid of bone) and tore bones (solids) from the skeleton. Abnormal bones were removed (deleted) or repositioned to correct the skeletal morphology or to accommodate a prosthesis. The prosthesis was designed as a template volume and used to replace a joint. The bones and prosthesis can join together to work as a knee. The object volume was a stack of two-dimensional image slice information, such as 24 computer tomographic slice data, at a 256×256 resolution. The object volume was enlarged as 40×256×256 resolution for easy manipulation. The template volume was 15×256×256 resolution. In the example, a tracker was attached to surgical tools to simulate virtual saws and knives that were used to generate cutting surfaces. The position and altitude of the tracker then determine the position of two ends of a cutting edge, and two triangles approximating the swept surface of the cutting edge are obtained by connecting the two opposite ends of the current and previous positions of the cutting edge. The number of new boundary faces that can be calculated is used to limit the feeding rate of the cutting edge for ensuring real-time responses. Virtual hands were used to indicate the movement vector. Small colored squares were used to help positioning in a virtual reality environment when wearing a shutter glass.

The example disclosed in the aforesaid provisional application demonstrated that the knee arthroplasty could correct the mal-positioned tibia, accommodate the tibia and femur to fit the prosthesis, and insert the prosthesis into the correct position. The complex changes in bone topologies and geometries involved in this surgery were accurately simulated through the computer-implemented method of this invention.

In summary, an extended voxel data structure has been presented to accurately represent the topology and geometry of volumetric surfaces, providing the possibility of accurately describing the results of intersections between volumetric surfaces and solids, and manipulating various operations on volumetric solids. As compared to existing methods that only use face-flags and distance-levels to improve rendering speed and quality, the present invention manipulates the face-flags and distance-levels to enable the closure check for the intersection of a surface and a solid, and thus makes various manipulations on solids feasible.

Furthermore, the present invention is efficient to allow real-time cutting simulations, and is interactive for most surgical simulations even under conventional personal computer platforms.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A computer-implemented method for constructing a three-dimensional model of an object volume, comprising the step of:

constructing cubic voxels that cooperatively define a three-dimensional solid of the three-dimensional model of the object volume, each of the voxels having a plurality of voxel faces, each of the voxel faces being parallel to one of three axes of a rectangular coordinate system, each of the voxels having a data structure that includes an object flag portion for describing the corresponding three-dimensional solid, a face flag portion for indicating which ones of the voxel faces serve as a boundary face of the corresponding three-dimensional solid, and a set of distance-levels that represent sample points of the voxel on the three axes of the rectangular coordinate system, wherein topology and geometry of a boundary of the three-dimensional solid are represented by the face flag portions and the distance-levels of the voxels that are positioned at the boundary.

2. The computer-implemented method of claim 1, wherein the cubic voxels are constructed from a stack of two-dimensional image slice information of the object volume.

3. A computer-implemented method for constructing and manipulating a three-dimensional model of an object volume, comprising the step of:

constructing cubic voxels that cooperatively define a three-dimensional solid of the three-dimensional model of the object volume, each of the voxels having a plurality of voxel faces, each of the voxel faces being parallel to one of three axes of a rectangular coordinate system, each of the voxels having a data structure that includes an object flag portion for describing the corresponding three-dimensional solid, a face flag portion for indicating which ones of the voxel faces serve as a boundary face of the corresponding three-dimensional solid, and a set of distance-levels that represent sample points of the voxel on the three axes of the rectangular coordinate system, wherein topology and geometry of a boundary of the three-dimensional solid are represented by the face flag portions and the distance-levels of the voxels that are positioned at the boundary; and rendering an image of the three-dimensional solid through a seed and flood algorithm.

4. The computer-implemented method of claim 3, wherein the seed and flood algorithm includes a building step for creating a new solid from a closed boundary of a null material by assigning a seed to the new solid for beginning the flood and by traversing and filling the object flag portions of the voxels inside the closed boundary with material flag of the new solid.

5. The computer-implemented method of claim 3, wherein the seed and flood algorithm includes a deletion step for nullifying a solid of a closed boundary and of a certain material by assigning a seed to the solid for beginning the flood and by traversing and filling the object flag portions of the voxels inside the closed boundary with null material flag.

6. The computer-implemented method of claim 3, wherein the seed and flood algorithm includes a tearing step for separating a solid by forming a cut surface that penetrates the solid and by filling the object flag portions of the voxels on one side of the cut surface with another object flag to form a new solid on said one side of the cut surface.

7. The computer-implemented method of claim 3, wherein the seed and flood algorithm includes a joining step for repositioning a joining solid to contact a joined solid, filling all of the voxels of the joined and joining solids by a flood beginning from a seed of the joining solid, and setting a boundary face shared by one joined solid voxel and one joining solid voxel as an interior for deleting the boundary between said one joined solid voxel and said one joining solid voxel.

8. The computer-implemented method of claim 3, wherein the seed and flood algorithm includes a subtracting step for separating a solid by forming a cut surface that penetrates the solid and by nullifying the voxels on one side of the cut surface.

9. The computer-implemented method of claim 3, wherein the seed and flood algorithm includes an expansion step for expanding a solid by connecting a closed boundary to the boundary of the solid and by filling the voxels inside the closed boundary with the object flag portions of the voxels inside the solid.

10. The computer-implemented method of claim 3, wherein the seed and flood algorithm includes a repositioning step in which a solid is stored into a series of stacks during the flood, the object flag portions of the voxels of the solid are filled with null material flag, and the voxels in every stack are placed at new positions.

11. A computer-implemented method for constructing and manipulating a three-dimensional model of an anatomical part, comprising the steps of:

providing a stack of two-dimensional image slice information of the body part;

constructing cubic voxels from the image slice information, the voxels cooperatively defining a three-dimensional solid of the three-dimensional model of the body part, each of the voxels having a plurality of voxel faces, each of the voxel faces being parallel to one of three axes of a rectangular coordinate system, each of the voxels having a data structure that includes an object flag portion for describing the corresponding three-dimensional solid, a face flag portion for indicating which ones of the voxel faces serve as a boundary face of the corresponding three-dimensional solid, and a set of distance-levels that represent sample points of the voxel on the three axes of the rectangular coordinate system, wherein topology and geometry of a boundary of the three-dimensional solid are represented by the face flag portions and the distance-levels of the voxels that are positioned at the boundary; and manipulating the three-dimensional solid for surgical simulation.

12. The computer-implemented method of claim 11, wherein the image slice information are computer tomographic slice data.

13. The computer-implemented method of claim 11, wherein the object flag portion of each of the voxels includes a material flag.

14. The computer-implemented method of claim 13, wherein the material flag has a value that is correlated with a threshold value.

15. The computer-implemented method of claim 11, further comprising the step of constructing a voxelized three-dimensional tool solid of a surgical tool for surgical simulation.

16. The computer-implemented method of claim 15, wherein Boolean operations are implemented on the tool solid and the solid of the body part for surgical simulation.

17. The computer-implemented method of claim 11, further comprising the step of constructing a voxelized three-dimensional implant solid of a surgical implant for surgical simulation.

18. The computer-implemented method of claim 17, wherein Boolean operations are implemented on the implant solid and the solid of the body part for surgical simulation.

19. The computer-implemented method of claim 11, wherein manipulation of the three-dimensional solid is conducted through a seed and flood algorithm.

20. The computer-implemented method of claim 19, wherein the seed and flood algorithm includes a building step for creating a new solid from a closed boundary of a null material by assigning a seed to the new solid for beginning the flood and by traversing and filling the object flag portions of the voxels inside the closed boundary with material flag of the new solid.

21. The computer-implemented method of claim 19, wherein the seed and flood algorithm includes a deletion step for nullifying a solid of a closed boundary and of a certain material by assigning a seed to the solid for beginning the flood and by traversing and filling the object flag portions of the voxels inside the closed boundary with null material flag.

22. The computer-implemented method of claim 19, wherein the seed and flood algorithm includes a tearing step for separating a solid by forming a cut surface that penetrates the solid and by filling the object flag portions of the voxels on one side of the cut surface with another object flag to form a new solid on said one side of the cut surface.

23. The computer-implemented method of claim 19, wherein the seed and flood algorithm includes a joining step for repositioning a joining solid to contact a joined solid, filling all of the voxels of the joined and joining solids by a flood beginning from a seed of the joining solid, and setting a boundary face shared by one joined solid voxel and one joining solid voxel as an interior for deleting the boundary between said one joined solid voxel and said one joining solid voxel.

24. The computer-implemented method of claim 19, wherein the seed and flood algorithm includes a subtracting step for separating a solid by forming a cut surface that penetrates the solid and by nullifying the voxels on one side of the cut surface.

25. The computer-implemented method of claim 19, wherein the seed and flood algorithm includes an expansion step for expanding a solid by connecting a closed boundary to the boundary of the solid and by filling the voxels inside the closed boundary with the object flag portions of the voxels inside the solid.

26. The computer-implemented method of claim 19, wherein the seed and flood algorithm includes a repositioning step in which a solid is stored into a series of stacks during the flood, the object flag portions of the voxels of the solid are filled with null material flag, and the voxels in every stack are placed at new positions.

27. The computer-implemented method of claim 19, further comprising a collision test to detect overlapping with other solids.

28. A voxel used to define a computer-generated three-dimensional solid of a three-dimensional model of an object volume, said voxel having a plurality of voxel faces, each of said voxel faces being parallel to one of three axes of a rectangular coordinate system, said voxel having a data structure that comprises:
   an object flag portion for describing the corresponding three-dimensional solid;
   a face flag portion for indicating which ones of said voxel faces serve as a boundary face of the corresponding three-dimensional solid; and
   a set of distance-levels that represent sample points of said voxel on the three axes of the rectangular coordinate system.

29. A computer-generated three-dimensional solid to represent a three-dimensional model of an object volume, comprising cubic voxels that cooperatively define the three-dimensional solid, each of said voxels having a plurality of voxel faces, each of said voxel faces being parallel to one of three axes of a rectangular coordinate system, each of said voxels having a data structure that includes an object flag portion for describing the three-dimensional solid, a face flag portion for indicating which ones of said voxel faces serve as a boundary face of the three-dimensional solid, and a set of distance-levels that represent sample points of said voxel on the three axes of the rectangular coordinate system, wherein topology and geometry of a boundary of the three-dimensional solid are represented by the face flag portions and the distance-levels of said voxels that are positioned at the boundary.

30. The computer-generated three-dimensional solid of claim 29, wherein the cubic voxels are constructed from a stack of two-dimensional image slice information of the object volume.

31. The computer-generated three-dimensional solid of claim 29, wherein object volume is an anatomical part.

* * * * *